United States Patent
Wu et al.

(10) Patent No.: US 9,929,799 B2
(45) Date of Patent: Mar. 27, 2018

(54) NETWORK AND USER EQUIPMENT OF HD-FDD COMMUNICATION SYSTEM FOR HANDLING HARQ

(71) Applicant: HTC Corporation, Taoyuan (TW)

(72) Inventors: Chih-Yao Wu, Taoyuan (TW); Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 107 days.

(21) Appl. No.: 14/801,801

(22) Filed: Jul. 16, 2015

(65) Prior Publication Data

US 2016/0020849 A1 Jan. 21, 2016

Related U.S. Application Data

(60) Provisional application No. 62/026,053, filed on Jul. 18, 2014.

(51) Int. Cl.

| H04B 7/26 | (2006.01) |
| H04L 1/18 | (2006.01) |
| H04L 5/00 | (2006.01) |
| H04W 56/00 | (2009.01) |

(52) U.S. Cl.
CPC ......... *H04B 7/2615* (2013.01); *H04B 7/2643* (2013.01); *H04L 1/1812* (2013.01); *H04L 5/0055* (2013.01); *H04W 56/0005* (2013.01)

(58) Field of Classification Search
CPC ... H04B 7/2615; H04B 7/2643; H04L 1/1812; H04L 5/0055; H04W 56/0005
See application file for complete search history.

(56) References Cited

U.S. PATENT DOCUMENTS

| 2013/0223298 A1* | 8/2013 | Ahn | H04B 7/2643 370/280 |
| 2013/0242824 A1* | 9/2013 | Lee | H04L 1/1819 370/281 |
| 2014/0010127 A1* | 1/2014 | Cheng | H04L 5/14 370/280 |

(Continued)

OTHER PUBLICATIONS

3GPP TR 36.828, V11.0.0, Jun. 2012.
3GPP TSG RAN WG1 Meeting #75 R1-135001, Nov. 11, 2013.
3GPP TS 36.213, V12.2.0, Jun. 2014.

*Primary Examiner* — Paul H Masur
(74) *Attorney, Agent, or Firm* — Winston Hsu (57) ABSTRACT

A network of a half-duplex frequency division duplex (HD-FDD) communication system for handling hybrid automatic repeat request (HARQ) includes a processing means for executing a program; and a storage unit, coupled to the processing means, for storing the program. The program instructs the processing means to perform the following steps: determining a first timing reference for a HARQ of downlink (DL) transmission from a first set of predetermined timing references, and determining a second timing reference for a HARQ of uplink (UL) transmission from a second set of predetermined timing references; and transmitting the first timing reference and the second timing reference to a user equipment of the HD-FDD communication system, allowing the user equipment to perform the HARQ of DL transmission based on the first timing reference and perform the HARQ of UL transmission based on the second timing reference.

20 Claims, 6 Drawing Sheets

| HD-FDD UL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 4 | 4 | 4 | 4 | 4 | 4 | 4 | 4 | 4 |
| 1 | 7,6 | 4 | | | | 7,6 | 4 | | | |
| 2 | | 4 | | | 6 | | 4 | | | 6 |
| 3 | | | | 6 | | | | | 6 | |
| 4 | 6 | | | | | | | | 6 | 6 |
| 5 | | | | | | | | | 6 | 6 |
| 6 | | | | | | | | | 6 | |
| 7 | 6 | 4 | | | | 7 | 4 | | | 6 |

(56) References Cited

U.S. PATENT DOCUMENTS

| | | | |
|---|---|---|---|
| 2014/0198680 A1* | 7/2014 | Siomina | H04L 5/14 370/252 |
| 2015/0030090 A1* | 1/2015 | You | H04L 5/14 375/260 |
| 2015/0215107 A1* | 7/2015 | Siomina | H04L 5/16 370/281 |
| 2015/0250017 A1* | 9/2015 | Ingale | H04B 7/2615 370/280 |
| 2015/0312371 A1* | 10/2015 | Han | H04L 67/2852 370/281 |
| 2016/0218838 A1* | 7/2016 | Cui | H04B 7/2643 |
| 2016/0254901 A1* | 9/2016 | You | H04W 76/048 370/281 |
| 2017/0111106 A1* | 4/2017 | Lee | H04B 7/2615 |
| 2017/0149552 A1* | 5/2017 | Vejlgaard | H04L 5/16 |

\* cited by examiner

| HD-FDD DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 4 | 4 | 4 | 4 | 4 | 4 | 4 | 4 | 4 |
| 1 | - | - | 6 | - | 4 | - | - | 6 | - | 4 |
| 2 | - | - | 7,6 | 4 | - | - | - | 7,6 | 4 | - |
| 3 | - | - | 8,7,4,6 | - | - | - | - | 8,7,4,6 | - | - |
| 4 | - | - | 7,6,11 | 6,5 | 5,4 | - | - | - | - | - |
| 5 | - | - | 12,8,7,11 | 6,5,4,7 | - | - | - | - | - | - |
| 6 | - | - | 13,12,9,8,7,5,4,11,6 | - | - | - | - | - | - | - |
| 7 | - | - | 7 | 7 | 5 | - | - | 7 | 7 | - |
| 8 | - | - | 6,5 | 5,4 | 4 | - | - | 6,5 | 5,4 | 4 |
| 9 | - | - | 7,6 | 6,5,4 | - | - | - | 7,6 | 6,5,4 | - |
| 10 | - | - | 8,7,6,5,4 | - | - | - | - | 8,7,6,5,4 | - | - |
| 11 | - | - | 11,10,9,8,7,6 | 6,5 | 5,4 | - | - | - | - | - |
| 12 | - | - | 12,11,10,9,8,7 | 7,6,5,4 | - | - | - | - | - | - |
| 13 | - | - | 13,12,11,10,9,8,7,6,5,4 | - | - | - | - | - | - | - |
| 14 | - | - | 8,7 | 7,6 | 6,5 | - | - | 7 | 7,6,5 | - |

FIG. 4

| HD-FDD UL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 4 | 4 | 4 | 4 | 4 | 4 | 4 | 4 | 4 |
| 1 | 7,6 | 4 | | | | 7,6 | 4 | | | |
| 2 | | 4 | | | 6 | | 4 | | | 6 |
| 3 | | | | 6 | | | | | 6 | |
| 4 | 6 | | | | | | | | 6 | 6 |
| 5 | | | | | | | | | 6 | 6 |
| 6 | | | | | | | | | 6 | |
| 7 | 6 | 4 | | | | 7 | 4 | | | 6 |

NETWORK AND USER EQUIPMENT OF HD-FDD COMMUNICATION SYSTEM FOR HANDLING HARQ

CROSS REFERENCE TO RELATED APPLICATIONS

This application claims the benefit of U.S. Provisional Application No. 62/026,053, filed on Jul. 18, 2014 and entitled "Method and Apparatus for Acknowledgement Feedback Timing Determination of Half-Duplex FDD Communication system", the contents of which are incorporated herein by reference.

BACKGROUND OF THE INVENTION

1. Field of the Invention

The present invention relates to a method and apparatus utilized in a half-duplex frequency division duplex (HD-FDD) system, and more particularly, to a method and apparatus for handling hybrid automatic repeat request (HARQ) in an HD-FDD system.

2. Description of the Prior Art

A long-term evolution (LTE) system supporting the 3rd Generation Partnership Project (3GPP) Rel-8 standard and/or the 3GPP Rel-9 standard is developed by the 3GPP as a successor of a universal mobile telecommunication system (UMTS) for further enhancing performance of the UMTS to satisfy increasing needs of users. The LTE system includes a new radio interface and a new radio network architecture that provide high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques such as carrier aggregation (CA), coordinated multipoint (COMP) transmission/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Machine-type communication (MTC) is one type of data communication including one or more entities not requiring human interactions. That is, the MTC refers to the concept of communication based on a network such as the existing GERAN, UMTS, long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has features different from that of a typical MS. Therefore, a service optimized to the MTC may differ from a service optimized to human-to-human communication.

The MTC devices, which are regarded as low cost, small and pervasive, have drawn a lot of attention in 3GPP standard developing due to their ability to augment the usage scenarios of 3GPP standard. Their transmission and reception abilities are limited (e.g., limited bandwidth usage, limited buffer and limited number of antennas). By removing extra duplexers, the half-duplex frequency division duplex (HD-FDD) mobile devices can provide further cost reduction. This extra cost reduction is helpful for pushing the MTC markets. Therefore, specific design towards HD-FDD devices is desirable in future 3GPP releases.

Although HD-FDD devices can have further cost reduction due to removing unnecessary duplexers, they suffer from their inability of having simultaneous transmission/reception in both uplink (UL) and downlink (DL) directions. If their hybrid automatic repeat request acknowledgement and negative acknowledgement (HARQ ACK/NACK) timing related to DL transmission directly follows the legacy FDD HARQ ACK/NACK timing (i.e., an ACK/NACK is transmitted on 4 milliseconds (ms) after the detection of DL transmission), the subframe where ACK/NACK is transmitted cannot be used for another DL transmission. Because there is only one ACK/NACK transmission in the UL subframe, only half of the subframes can be used for DL transmission, which results in huge reduction of throughput. Also, the frequency resource is expected to be limited for future MTC devices (e.g., the total number of used physical resource block pairs is small). Therefore, the availability and efficiency in the usage of time resources become far important. On the other hand, UL transmission suffers from the same problem. Thus, there is a need to improve the system throughput for operations in the HD-FDD communication system.

SUMMARY OF THE INVENTION

It is therefore an objective of the present invention to provide a method and apparatus for handling hybrid automatic repeat request (HARQ) in a half-duplex frequency division duplex (HD-FDD) communication system.

The present invention discloses a network of an HD-FDD communication system for handling HARQ. The network comprises a processing means, for executing a program; and a storage unit, coupled to the processing means, for storing the program. The program instructs the processing means to perform the following steps: determining a first timing reference for a HARQ of downlink (DL) transmission from a first set of predetermined timing references, and determining a second timing reference for a HARQ of uplink (UL) transmission from a second set of predetermined timing references; and transmitting the first timing reference and the second timing reference to a user equipment of the HD-FDD communication system, allowing the user equipment to perform the HARQ of DL transmission based on the first timing reference and perform the HARQ of UL transmission based on the second timing reference.

The present invention further discloses a user equipment of an HD-FDD communication system for handling HARQ. The user equipment comprises a processing means, for executing a program; and a storage unit, coupled to the processing means, for storing the program. The program instructs the processing means to perform the following steps: receiving a first timing reference for a HARQ of DL transmission and a second timing reference for a HARQ of UL transmission from a network of the HD-FDD communication system; and performing the HARQ of DL transmission based on the first timing reference and performing the HARQ of UL transmission based on the second timing reference; wherein the first timing reference is determined from a first set of predetermined timing references, and the second timing reference is determined from a second set of predetermined timing references.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
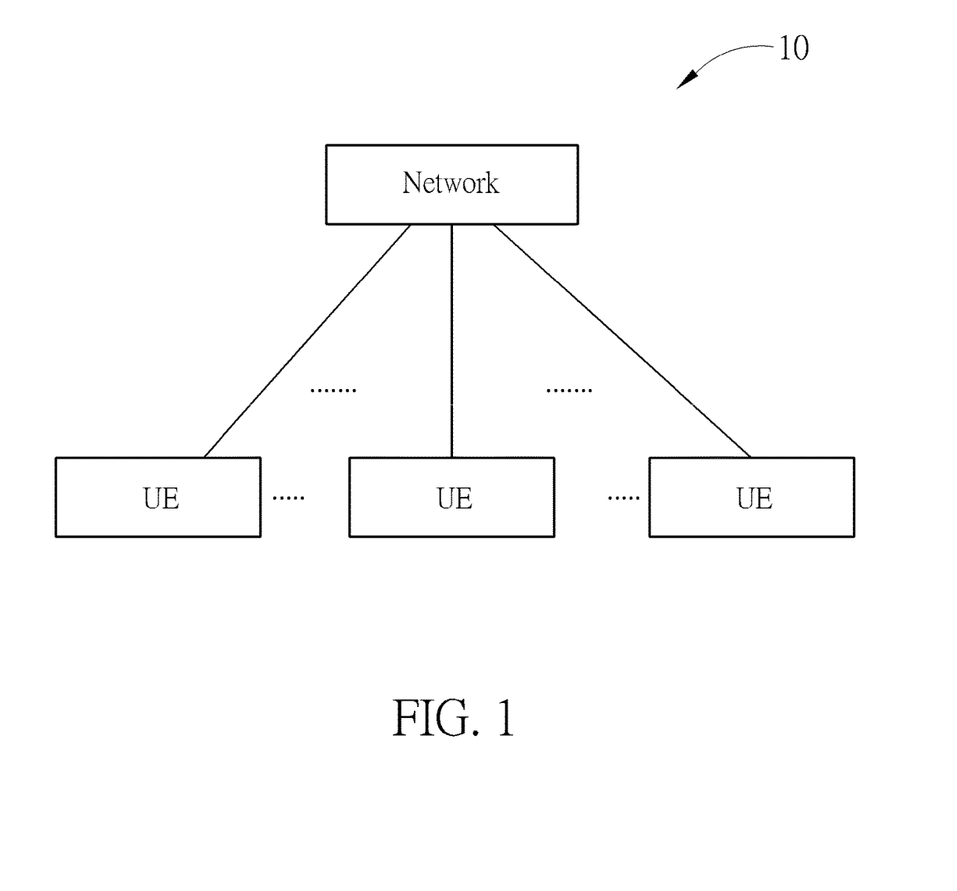
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of user equipments (UEs). In FIG. 1, the network and the UEs are simply utilized for illustrating the structure of the wireless communication system 10. Practically, the network may be a public land mobile network (PLMN), such as a GERAN (GSM/EDEG radio access network) of a 2G/2.5G GSM system, a UTRAN (UMTS radio access network) of a 3G UMTS system, or an EUTRAN (evolved-UTAN) of the LTE system, comprising a plurality of base stations (i.e. BTSs, Node-Bs, or eNBs), network controllers (i.e. Base Station Controllers or Radio Network Controllers) and so on according to actual demands.

Each of the UEs may be a mobile station, a low cost device (e.g., a machine type communication (MTC) device), a mobile phone, a laptop, a tablet computer, an electronic book or a portable computer system. In addition, the network and the UE may be seen as a transmitter or a receiver according to direction (i.e. transmission direction), e.g., for an uplink (UL), the UE is the transmitter and the network is the receiver, and for a downlink (DL), the network is the transmitter and the UE is the receiver. More specifically, for the network, the direction of the transmission is DL, and the direction of the reception is UL. For the UE, the direction of the transmission is UL, and the direction of the reception is DL.

Note that in the wireless communication system 10, the UEs are half-duplex frequency division duplex (HD-FDD) mobile devices where duplexers of the UEs are removed (e.g., for cost reduction). Frequency division duplexing (FDD) allows UL transmissions and DL transmissions to be realized on different carrier frequencies, so that UL transmissions and DL transmissions may be performed on every subframe without collisions. In the HD-FDD wireless communication system 10 having HD-FDD mobile devices, one subframe is only allowed to be used for a UL transmission or a DL transmission since there is no duplexers. For short, the HD-FDD wireless communication system will be abbreviated as the HD-FDD system hereinafter.

Figure 2:
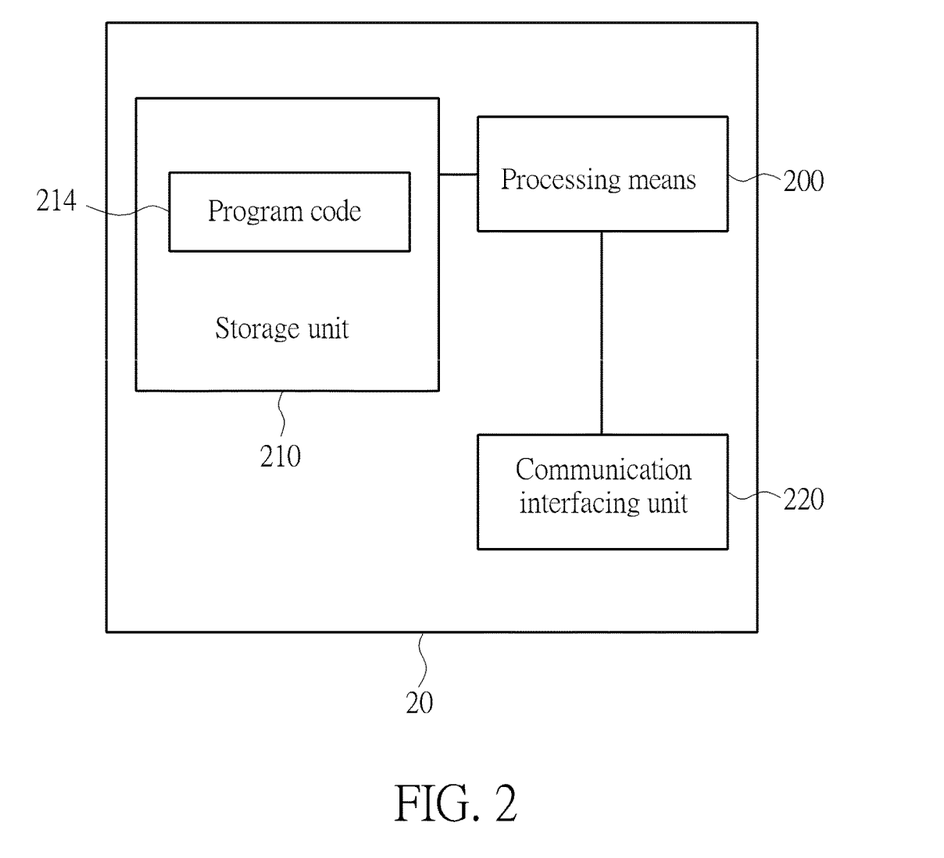
FIG. 2 is a schematic diagram of a communication device according to an example of the present invention.

Please refer to FIG. 2, which is a schematic diagram of a communication device 20 according to an example of the present invention. The communication device 20 may be used for realizing the network or the UEs shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
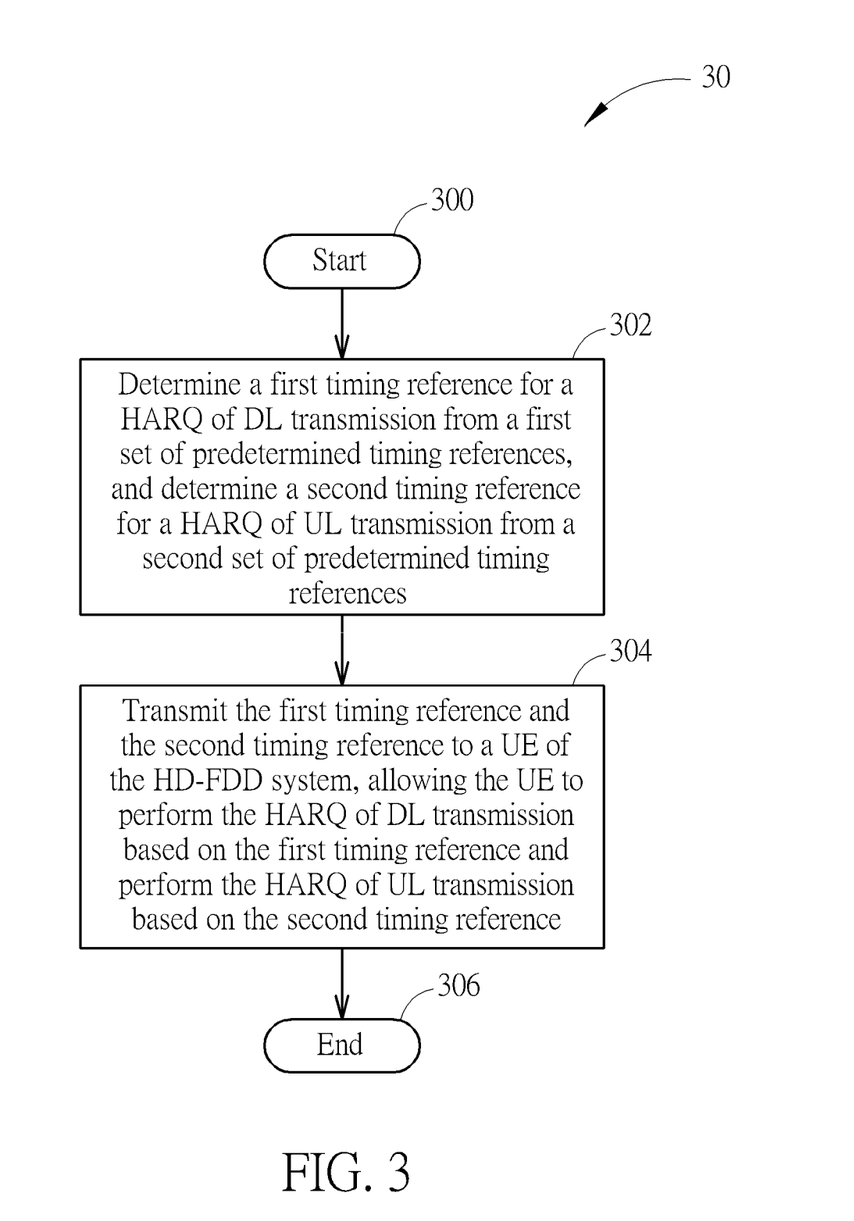
FIG. 3 is a flowchart of a process according to an example of the present invention.

Please refer to FIG. 3, which is a flowchart of a process 30 according to an example of the present invention. The process 30 may be utilized in the network (e.g., an eNB) of an HD-FDD system (e.g., the wireless communication system 10 shown in FIG. 1), for handling hybrid automatic repeat request (HARQ) in the HD-FDD system. The process 30 may be compiled into the program code 214 and includes the following steps:

Step 300: Start.

Step 302: Determine a first timing reference for a HARQ of DL transmission from a first set of predetermined timing references, and determine a second timing reference for a HARQ of UL transmission from a second set of predetermined timing references.

Step 304: Transmit the first timing reference and the second timing reference to a UE of the HD-FDD system, allowing the UE to perform the HARQ of DL transmission based on the first timing reference and perform the HARQ of UL transmission based on the second timing reference.

Step 306: End.

According to the process 30, a first set of timing references and a second set of timing references are determined. The eNB may determine a first timing reference for a HARQ of DL transmission from the first set of predetermined timing references, and determine a second timing reference for a HARQ of UL transmission from the second set of predetermined timing references. The eNB then transmits the first timing reference and the second timing reference to a UE (e.g., an MTC device) of the HD-FDD system, allowing the UE to perform the HARQ of DL transmission based on the first timing reference and perform the HARQ of UL transmission based on the second timing reference.

Please note that in an LTE/LTE-A system, an acknowledgement (ACK) or a negative acknowledgement (NACK) should be reported in response to a data transmission in DL or UL direction, to notify the eNB or the UE whether the transmitted data is correct or not. The HARQ specifies a mechanism of ACK/NACK transmission, which comprises reporting of an ACK or NACK after the data is transmitted, where the timing rule of reporting the ACK or NACK is predetermined. For example, in a general FDD system, a UL (or DL) ACK/NACK is transmitted 4 milliseconds (ms) after the corresponding DL (or UL) data transmission occurs; that is, if the data is transmitted in subframe X, the reporting of ACK/NACK is performed in subframe X+4. On the other hand, in a time division duplex (TDD) system, 7 UL/DL configurations are predefined to limit the transmission direction in each subframe, and the UL or DL ACK/NACK transmission should be limited to a timing rule derived from the predefined UL/DL configuration.

Note that in an HD-FDD system, a subframe cannot support bidirectional transmission simultaneously without duplexers, such that resources may be wasted if a subframe is only used for transmitting an ACK/NACK based on the timing rule of FDD systems. Therefore, in the present invention, another timing rule is further provided for ACK/NACK reporting in an HD-FDD system. The timing rule is capable of transmitting a plurality of ACKs and NACKs in response to different data transmissions in the same direction on one subframe, and also enjoys the benefit of flexibility in UL/DL data transmission.

Figure 4:
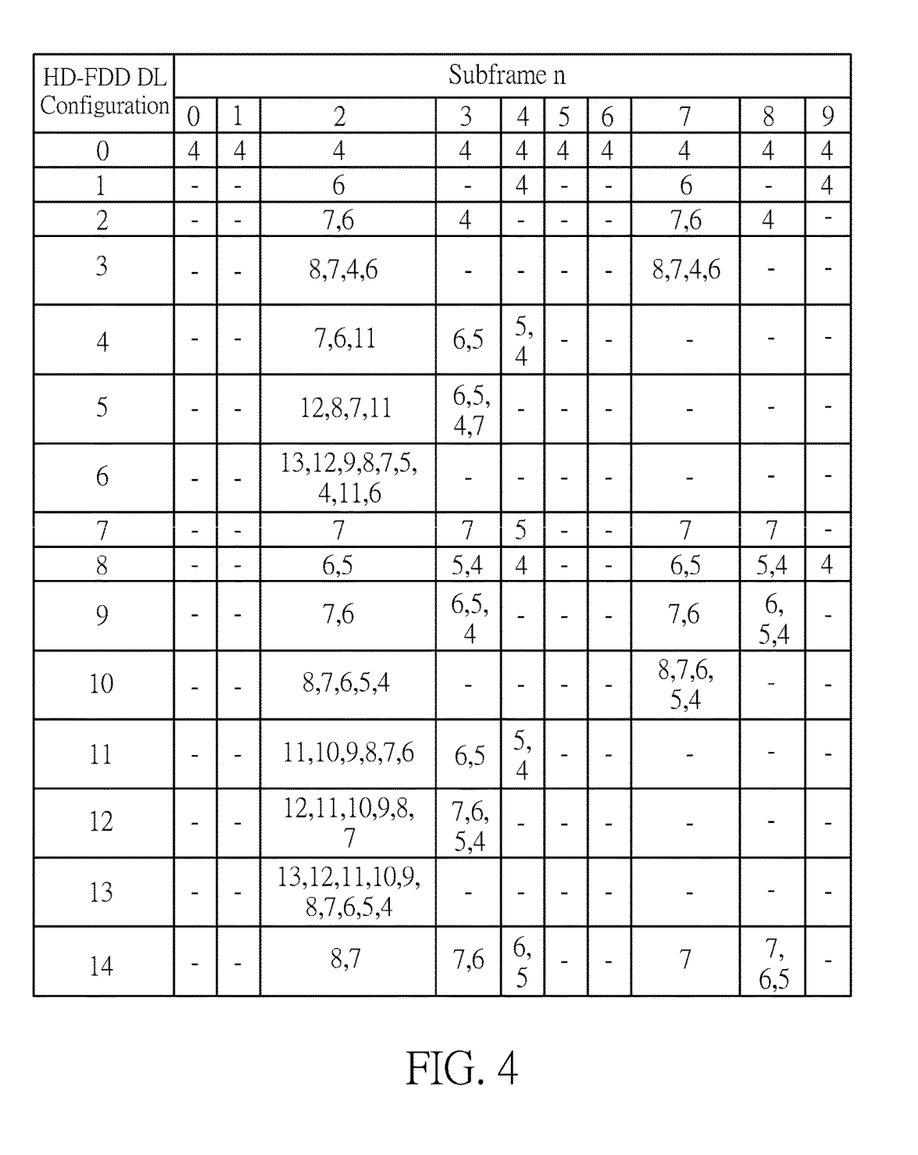
FIG. 4 illustrates a table of the first set of predetermined timing references for the HARQ of DL transmission in the HD-FDD system according to an example of the present invention.

In the present invention, the HARQ of DL transmission refers to associated UL HARQ ACKs/NACKs following DL data transmissions, and the HARQ of UL transmission refers to associated DL HARQ ACKs/NACKs following UL data transmissions. Please refer to FIG. 4, which illustrates a table of the first set of predetermined timing references for the HARQ of DL transmission in the HD-FDD system according to an example of the present invention. As shown in FIG. 4, the first set of predetermined timing references includes 15 HD-FDD DL configurations numbered from 0 to 14. For each HD-FDD DL configuration, the UL ACK/NACK(s) transmitted in the subframe n is related to the DL transmission in one or several subframes prior to the subframe n according to the table. For example, for subframe 6 of HD-FDD DL configuration 0, the number 4 indicates that the transmitted ACK/NACK is in response to data transmission in the fourth subframe previous to the subframe 6, i.e., subframe 2. For subframe 2 of HD-FDD DL configuration 2, the numbers 6 and 7 indicate that there are two ACK/NACKs transmitted in this subframe, where the two ACK/NACKs are respectively in response to data transmissions in the sixth and seventh subframes previous to the subframe 2.

In this case, the first set of predetermined timing references include a timing configuration for HARQ ACK/NACK reporting in an FDD system, i.e., configuration 0. As can be seen, an ACK or NACK is transmitted on 4 ms (i.e., 4 subframes) after the corresponding data transmission is performed. The first set of predetermined timing references further include UL/DL configurations for HARQ ACK/NACK reporting in a TDD system and UL/DL configurations for HARQ ACK/NACK reporting in an FDD-TDD carrier aggregation (CA) system. In the table of the first set of predetermined timing references shown in FIG. 1, configurations 1-7 adopt the DL timing references derived from the UL/DL configurations 0-6 of the TDD system, and configurations 8-14 adopt the DL timing references derived from the UL/DL configurations 0-6 of the FDD-TDD system. In the configurations 1-14 of the first set of predetermined timing references, multiple ACK/NACKs are allowed to be reported in the same subframe. Note that the FDD-TDD system refers to a hybrid FDD/TDD system with CA, where every subframe is able to perform DL transmission in an FDD cell, but not in a TDD cell. If a HARQ ACK/NACK reporting is required to be performed in the TDD cell, a table with UL/DL configurations for the HARQ ACK/NACK reporting in the FDD/TDD CA system is necessary, in order to prevent violations of the TDD timing rule.

With the first set of predetermined timing references, the eNB is allowed to select one of the configurations 0-14 as the first timing reference. The eNB and corresponding UEs will perform HARQ transmission according to the selected timing reference.

Figure 5:
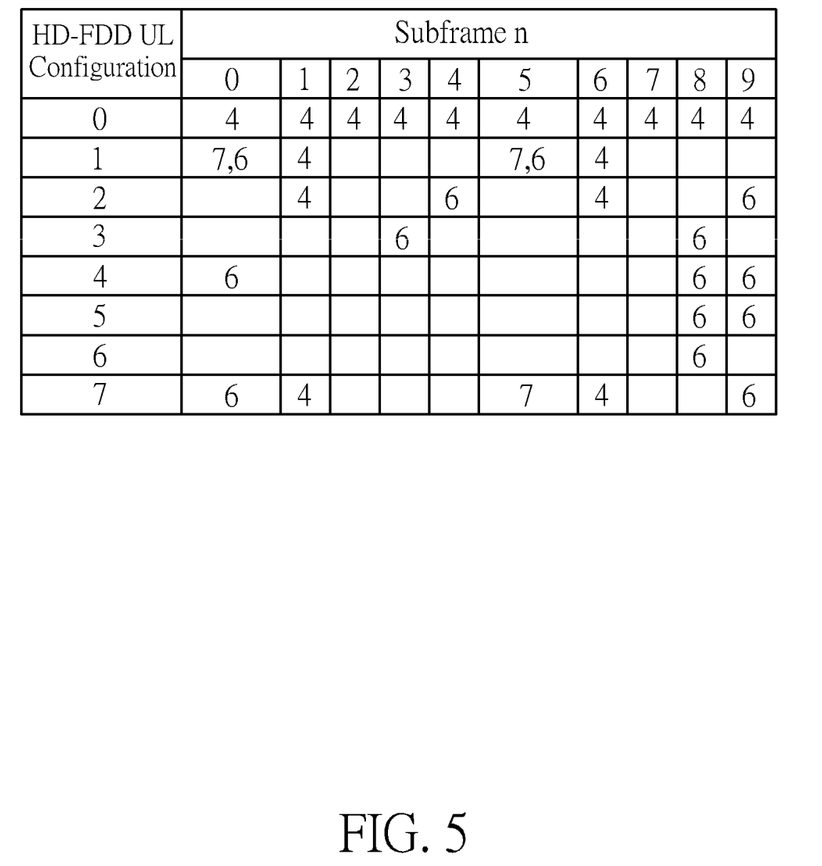
FIG. 5 illustrates a table of the second set of predetermined timing references for the HARQ of UL transmission in the HD-FDD system according to an example of the present invention.

Please refer to FIG. 5, which illustrates a table of the second set of predetermined timing references for the HARQ of UL transmission in the HD-FDD system according to an example of the present invention. As shown in FIG. 5, the second set of predetermined timing references includes 8 HD-FDD UL configurations numbered from 0 to 7, which include a timing configuration for HARQ ACK/NACK reporting in an FDD system and UL/DL configurations for HARQ ACK/NACK reporting in a TDD system. In another example, the second set of predetermined timing references may also include the UL timing references in UL/DL configurations for HARQ ACK/NACK reporting in an FDD-TDD CA system. Detailed operations related to the second set of predetermined timing references are similar to those related to the first set of predetermined timing references, and will not be narrated herein.

Please note that in a TDD system, the transmission direction (e.g., UL or DL) in every subframe is predefined by the network in a specific UL/DL configuration. For example, the predefined transmission direction in subframe 0 of every UL/DL configuration is DL, so there may not be any UL transmission in subframe 0. In contrast, according to the embodiments of the present invention, the HARQ ACK/NACK reporting follows the timing rules defined in the HD-FDD UL/DL configurations, but other data transmissions are not limited in UL or DL subframes; that is, there is no subframe restricted to transmit UL data or DL data. For example, subframe 8 of HD-FDD DL configuration 2 is used for reporting UL ACK/NACK for DL data in subframe 4, but the subframe 8 in other time frames may still be used for transmitting DL data. The HD-FDD UL/DL configurations provide the timing references for HARQ ACK/NACK reporting, rather than restrict the transmission direction in a subframe as in the TDD system. Therefore, flexibility still remains in the HD-FDD system.

Further note that the HD-FDD DL configurations and HD-FDD UL configurations illustrated in FIGS. 4 and 5 are composed of timing configuration in the FDD system, UL/DL configurations in the TDD system and/or UL/DL configurations in the FDD-TDD CA system. According to the UL/DL configurations in the TDD system and the FDD-TDD CA system, subframe 0 is restricted to perform UL transmission and subframe 2 is restricted to perform DL transmission. In contrast, according to the embodiments of the present invention, every subframe can be used for both UL and DL transmissions. In such a condition, even if any of the HD-FDD DL configurations 1-14 is applied as the timing reference for HARQ ACK/NACK reporting, subframes 0 and 1 are still able to transmit other DL data. When the DL traffic is heavy, the eNB may transmit DL data on any available subframes. The flexibility of UL/DL assignments of subframes prevents several subframes from being restricted to UL or DL transmission, and thereby achieves a higher throughput. In another embodiment, the UL/DL assignments for HARQ may be configured by a timing rule other than those shown in the tables of FIGS. 4 and 5, and every subframe is able to be used for UL or DL transmission based on the configured timing rule.

Therefore, the DL HARQ transmission and the UL HARQ transmission are allowed to use different timing references; that is, an index of the first timing reference in the first set of predetermined timing references (i.e., the HD-FDD configurations) may be different from an index of the second timing reference in the second set of predetermined timing references (i.e., the HD-FDD UL configurations). For example, the first timing reference for the HARQ of DL transmission is selected from HD-FDD DL configuration 1 among the first set of predetermined timing references, while the second timing reference for the HARQ of UL transmission is selected from HD-FDD UL configuration 2 among the second set of predetermined timing references. The tradeoff between complexity of the eNB scheduler and system throughput may be controlled flexibly with selection of various HD-FDD UL/DL configurations. It should be noted that in the TDD system, the UL and DL transmissions should follow the same UL/DL configuration, in order to prevent conflict between UL and DL configurations.

In an example, the first timing reference and the second timing reference for data transmissions in a time frame are transmitted from the eNB to the UE when the time frame starts. In such a condition, HARQ ACK/NACK for the data transmitted in the time frame will follow the timing rules of the first timing reference and the second timing reference. For example, the eNB may transmit an indication indicating HD-FDD DL configuration 5 when a time frame starts, so that the UE may perform HARQ of DL transmission based on the HD-FDD DL configuration 5 in this time frame. Subsequently, the eNB may transmit an indication indicating HD-FDD DL configuration 7 when the next time frame starts, so that the UE may perform HARQ of DL transmission based on the HD-FDD DL configuration 7 in this time frame.

In another example, the first timing reference indicating a UL ACK or NACK of HARQ corresponding to a DL transmission is transmitted from the eNB to the UE when the DL transmission is performed; and the second timing reference indicating a DL ACK or NACK of HARQ corresponding to a UL transmission is transmitted from the eNB to the UE when the UL transmission is performed. In this case, a timing reference is determined for each transmitted data. For example, the eNB may notify the UE that the timing reference is HD-FDD DL configuration 3 when transmitting DL data, so that the UE will report ACK/NACK according to the timing rule defined in HD-FDD DL configuration 3. The timing rule may be different in consecutive data transmissions; hence, the timing rules should be scheduled in a proper manner to avoid collisions of HARQ ACK/NACK transmissions.

In the abovementioned examples, the timing reference is determined dynamically, where the determined HD-FDD UL/DL configuration may be the same or different in consecutive time frame or between every data transmission. Preferably, the eNB and the UE perform HARQ of DL and UL transmissions based on the enhanced interference mitigation and traffic adaptation (eIMTA) defined for the TDD system in LTE. The eIMTA defines a rule of reconfiguration that may not cause discontinuity in HARQ timing, and thereby allows dynamic change of the UL/DL configurations. For example, according to the table of valid UL/DL configurations for dynamic reconfiguration proposed by 3GPP, UL configuration 0 and DL configuration 2 of the TDD system may be compatible to dynamic change between UL/DL configurations 0, 1, 2 and 6.

Please note that the first timing reference and the second timing reference may be determined based on a traffic condition of the UE, an interference level and/or a cell loading of the network. For example, with a heavy DL traffic, an HD-FDD DL configuration where more UL ACK/NACKs are transmitted in one subframe may be selected, in order to allow more subframes to be used for DL transmissions. Alternatively, the first timing reference and the second timing reference may be determined on a static basis, which is realized by associating a UE's identity (ID) with a first timing reference within the first set of predetermined timing references and/or a second timing reference within the second set of predetermined timing references.

It should be noted that the first timing reference and the second timing reference are transmitted to the UE from the eNB via an appropriate signaling mechanism. For example, the first timing reference and the second timing reference may be transmitted from the network to the UE via a higher-layer signaling or a dynamic physical layer signaling. When the dynamic physical layer signaling (e.g., physical DL control channel (PDCCH)) is applied, a corresponding radio network temporary identifier (RNTI) (e.g., HD-FDD-RNTI) may be scrambled with the dynamic physical layer signaling. The dynamic physical layer signaling may be allocated within a corresponding UE-specific search space, where the dynamic physical layer signaling is different for each UE. In another example, the eNB may use the higher-layer signaling (e.g., a radio resource control (RRC) signaling) to transmit the timing reference information to the UE.

In addition, with dynamic assignment of timing references, there may be a short period where the eNB and the UE have different understandings of HARQ timing of UL/DL transmissions due to signaling and/or activation latency. In order to solve this problem, a predetermined period with a fixed length, within which the eNB may only perform HARQ operations of UL/DL transmissions in subframes with valid HARQ timing defined in both the previous timing reference and the newly configured timing reference, is introduced. For example, if the HARQ timing reference of DL transmission is changed from HD-FDD DL configuration 0 to HD-FDD DL configuration 1, HARQ operations of DL transmission can only be performed on subframes 4 and 9 within the ambiguity period since HD-FDD DL configurations 0 and 1 have the same timing reference for subframes 4 and 9, as shown in FIG. 4.

Figure 6:
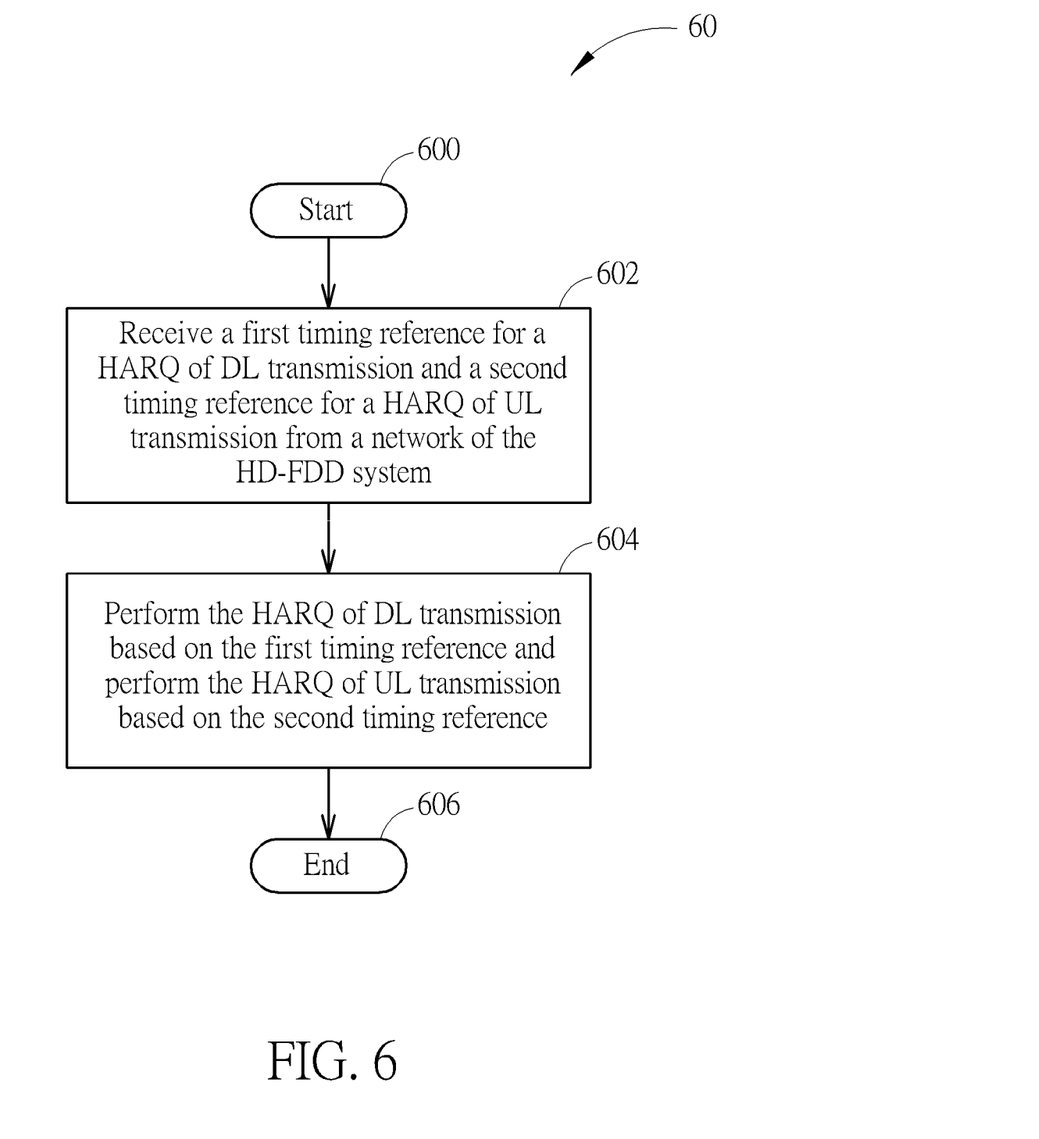
FIG. 6 is a flowchart of a process according to an example of the present invention.

The above operations of handling the HARQ timing references in the HD-FDD system may also be summarized into another process 60 utilized in the UE (e.g., an MTC device) of the HD-FDD system (e.g., the wireless communication system 10 shown in FIG. 1), as shown in FIG. 6. The process 60 may be compiled into the program code 214 and includes the following steps:

Step 600: Start.

Step 602: Receive a first timing reference for a HARQ of DL transmission and a second timing reference for a HARQ of UL transmission from a network of the HD-FDD system.

Step 604: Perform the HARQ of DL transmission based on the first timing reference and perform the HARQ of UL transmission based on the second timing reference.

Step 606: End.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method and apparatus for handling HARQ in a HD-FDD system. A first set of predetermined timing references for HARQ of DL transmission and a second set of predetermined timing references for HARQ of UL transmission may be predetermined. The eNB may select a first timing reference from the first set of predetermined timing references and select a second timing reference from the second set of predetermined timing references as the timing rules for reporting HARQ ACK/NACK, and then transmit the timing rules to the UE such as an MTC device. Therefore, the eNB and the UE may communicate and perform HARQ ACK/NACK reporting based on the timing rules. In this manner, the eNB may flexibly determine the timing rules, which allows a plurality of ACKs and NACKs in response to different data transmissions to be transmitted on one subframe. This enhances the system throughput while keeping the flexibility in the HD-FDD system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network of a half-duplex frequency division duplex (HD-FDD) communication system for handling hybrid automatic repeat request (HARQ), the network comprising:
   a processing means, for executing a program; and
   a storage unit, coupled to the processing means, for storing the program which instructs the processing means to perform the following steps:
      selecting a first timing reference for a HARQ of downlink (DL) transmission on a specific cell from a first set of predetermined timing references, and selecting a second timing reference for a HARQ of uplink (UL) transmission on the specific cell from a second set of predetermined timing references; and
      transmitting the first timing reference and the second timing reference to a user equipment of the HD-FDD communication system at the same time, allowing the user equipment to perform the HARQ of DL transmission based on the first timing reference and perform the HARQ of UL transmission based on the second timing reference;
      wherein the first timing reference determines a first timing for the user equipment to report an acknowledgement (ACK) or a negative acknowledgement (NACK) to the network for a first plurality of subframes where the user equipment receives a DL data transmission from the network, and the second timing reference determines a second timing for the user equipment to receive an ACK/NACK from the network for a second plurality of subframes where the user equipment transmits a UL data to the network; and
      wherein the first timing reference and the second timing reference are different.

2. The network of claim 1, wherein the HARQ comprises reporting of the ACK or the NACK.

3. The network of claim 2, wherein a plurality of ACKs and NACKs in response to different data transmissions are transmitted on one subframe.

4. The network of claim 1, wherein the first timing reference and the second timing reference for data transmissions in a time frame are transmitted to the user equipment when the time frame starts.

5. The network of claim 1, wherein the first timing reference indicating a UL ACK or NACK of HARQ corresponding to a DL transmission is transmitted to the user equipment when the DL transmission is performed, and the second timing reference indicating a DL ACK or NACK of HARQ corresponding to a UL transmission is transmitted to the user equipment when the UL transmission is performed.

6. The network of claim 1, wherein an index of the first timing reference in the first set of predetermined timing references is different from an index of the second timing reference in the second set of predetermined timing references.

7. The network of claim 1, wherein the first set of predetermined timing references comprise at least one of a timing configuration for HARQ ACK/NACK reporting in an FDD system, UL/DL configurations for HARQ ACK/NACK reporting in a time division duplex (TDD) system, and UL/DL configurations for HARQ ACK/NACK reporting in an FDD-TDD carrier aggregation system.

8. The network of claim 1, wherein the second set of predetermined timing references comprise at least one of a timing configuration for HARQ ACK/NACK reporting in an FDD system, and UL/DL configurations for HARQ ACK/NACK reporting in a TDD system.

9. The network of claim 1, wherein the first timing reference and the second timing reference are determined based on at least one of a traffic condition of the user equipment, an interference level and a cell loading of the network, or determined on a static basis.

10. The network of claim 1, wherein the first timing reference and the second timing reference are transmitted to the user equipment via a higher-layer signaling or a dynamic physical layer signaling.

11. A user equipment of a half-duplex frequency division duplex (HD-FDD) communication system for handling hybrid automatic repeat request (HARQ), the user equipment comprising:
    a processing means, for executing a program; and
    a storage unit, coupled to the processing means, for storing the program which instructs the processing means to perform the following steps:
       receiving a first timing reference for a HARQ of downlink (DL) transmission on a specific cell and a second timing reference for a HARQ of uplink (UL) transmission on the specific cell from a network of the HD-FDD communication system at the same time; and
       performing the HARQ of DL transmission based on the first timing reference and performing the HARQ of UL transmission based on the second timing reference;
       wherein the first timing reference is selected from a first set of predetermined timing references, and the second timing reference is selected from a second set of predetermined timing references;
       wherein the first timing reference determines a first timing for the user equipment to report an acknowledgement (ACK) or a negative acknowledgement (NACK) to the network for a first plurality of subframes where the user equipment receives a DL data transmission from the network, and the second timing reference determines a second timing for the user equipment to receive an ACK/NACK from the network for a second plurality of subframes where the user equipment transmits a UL data to the network; and
       wherein the first timing reference and the second timing reference are different.

12. The user equipment of claim 11, wherein the HARQ comprises reporting of the ACK or the NACK.

13. The user equipment of claim 12, wherein a plurality of ACKs and NACKs in response to different data transmissions are transmitted on one subframe.

14. The user equipment of claim 11, wherein the first timing reference and the second timing reference for data transmissions in a time frame are received from the network when the time frame starts.

15. The user equipment of claim 11, wherein the first timing reference indicating a UL ACK or NACK of HARQ corresponding to a DL transmission is received from the network when the DL transmission is performed, and the second timing reference indicating a DL ACK or NACK of HARQ corresponding to a UL transmission is received from the network when the UL transmission is performed.

16. The user equipment of claim 11, wherein an index of the first timing reference in the first set of predetermined timing references is different from an index of the second timing reference in the second set of predetermined timing references.

17. The user equipment of claim 11, wherein the first set of predetermined timing references comprise at least one of a timing configuration for HARQ ACK/NACK reporting in an FDD system, UL/DL configurations for HARQ ACK/NACK reporting in a time division duplex (TDD) system, and UL/DL configurations for HARQ ACK/NACK reporting in an FDD-TDD carrier aggregation system.

18. The user equipment of claim 11, wherein the second set of predetermined timing references comprise at least one of a timing configuration for HARQ ACK/NACK reporting in an FDD system, and UL/DL configurations for HARQ ACK/NACK reporting in a time division duplex (TDD) system.

19. The user equipment of claim 11, wherein the first timing reference and the second timing reference are determined based on at least one of a traffic condition of the user equipment, an interference level and a cell loading of the network, or determined on a static basis.

20. The user equipment of claim 11, wherein the first timing reference and the second timing reference are transmitted from the network via a higher-layer signaling or a dynamic physical layer signaling.

\* \* \* \* \*